United States Patent [19]

Carroll

[11] Patent Number: 5,350,222
[45] Date of Patent: Sep. 27, 1994

[54] AUXILIARY STABILIZER VALVE FOR VX VENT VALVE

[75] Inventor: John B. Carroll, Irwin, Pa.

[73] Assignee: Westinghouse Air Brake Company, Wilmerding, Pa.

[21] Appl. No.: 58,336

[22] Filed: May 10, 1993

[51] Int. Cl.⁵ .................... B60T 11/34; B60T 15/44
[52] U.S. Cl. .................................. 303/82; 303/33; 303/57; 303/68; 303/86
[58] Field of Search .............. 303/82, 86, 33, 34, 303/35, 36, 37, 38, 39, 40, 57, 42, 66, 68, 69, 81, 83, 77, 72; 137/494, 506

[56] References Cited

U.S. PATENT DOCUMENTS

| 4,974,911 | 12/1990 | Hart ................................. 303/82 |
| 5,207,482 | 5/1993 | Hart et al. ....................... 303/82 |

Primary Examiner—Douglas C. Butler
Attorney, Agent, or Firm—Gary J. Falce

[57] ABSTRACT

A railway car vent valve device having a nullifier valve that is selectively operable to disable the vent valve device during a single car test procedure in which the service stability of the car control valve is checked. The nullifier valve is automatically reset when the car brake pipe pressure drops below a predetermined value, such as occurs when the single car test apparatus is disconnected from the car brake pipe following completion of the single car test procedure.

16 Claims, 2 Drawing Sheets

AUXILIARY STABILIZER VALVE FOR VX VENT VALVE

BACKGROUND OF THE INVENTION

This invention relates to vent valve devices and particularly to a means for temporarily disabling a vent valve device when conducting a single car test in accordance with the new single car test procedure specified by the A.A.R. (Association of American Railroads) for checking the general condition of the brake system of "in date" railway freight cars and cars having undergone "periodic repairs". A single car test device enables this test procedure to be accomplished without removal of any of the air brake components from the car.

In one phase of this test procedure, referred to as the service stability test, the car control valve is checked to assure that it does not go to emergency during a service rate of reduction of brake pipe pressure. Typically, this test was performed satisfactorily without having to isolate the car vent valve device, when equipped with such. Recently, a revised single car test procedure was instituted, however, for carrying out the service stability test for control valves on long cars having over 75 feet of brake pipe. Essentially this revision of the test procedure requires a faster rate of brake pipe pressure reduction, which causes the car vent valve device to actuate. In order to prevent the vent valve from influencing the rate of brake pipe pressure reduction, when inadvertently actuated during the new single car test, the vent protector was removed and reinstalled in the vent valve exhaust port in its closed position to block the exhaust of brake pipe pressure. In the industry standard #8 and KM-2 vent valves, this proved to be an effective means of preventing an actuated vent valve from dumping brake pipe pressure and thereby adversely affecting the service stability test.

In attempting to employ this same procedure with the recently developed VX Vent Valve disclosed in U.S. Pat. No. 4,974,911, it was found that even with the vent valve exhaust port plugged, a sudden 1 psi drop in brake pipe pressure still occurs, due to the particular design of the exhaust valve diaphragm causing relatively high volumetric displacement when the vent valve is actuated. While this brake pipe pressure drop is beneficial in terms of transmitting an emergency application in actual operation, it adversely affects the control valve stability during the new service stability test.

SUMMARY OF THE INVENTION

In accordance with the foregoing, it is the object of the present invention to provide a means of selectively disabling a vent valve device that is low in cost, reliable in operation, and requires no tools to activate.

Another object of the invention is to provide a vent valve disabling mechanism that is automatically reset when brake pipe pressure is reduced below a predetermined value.

Briefly, these objectives are achieved in a vent valve device for locally venting a railway car brake pipe when an emergency rate of reduction of the fluid pressure carried in the brake pipe is initiated comprising a housing having an inlet port to which the brake pipe is connected, a vent port, a first chamber connected to the inlet port, and a second chamber, flow restrictor means between the first and second chambers for controlling the rate at which fluid pressure is released from said second chamber in response to a reduction of said brake pipe pressure to thereby establish a predetermined pressure differential between said first and second chambers when said brake pipe pressure is reduced at an emergency rate, piston valve means for establishing fluid pressure communication between the inlet port and vent port in accordance with a predetermined pressure differential being established between the first and second chambers and selectively operable disabling means for releasing fluid under pressure from said second chamber in parallel with said flow restrictor means to prevent such predetermined pressure differential between the first and second chambers from being established during the single car test procedure.

BRIEF DESCRIPTION OF THE DRAWINGS

Other objects and attendant advantages of the invention will become apparent from the following, more detailed explanation of a preferred form of the invention when taken with the accompanying drawings in which.

DESCRIPTION AND OPERATION

Figure 1:
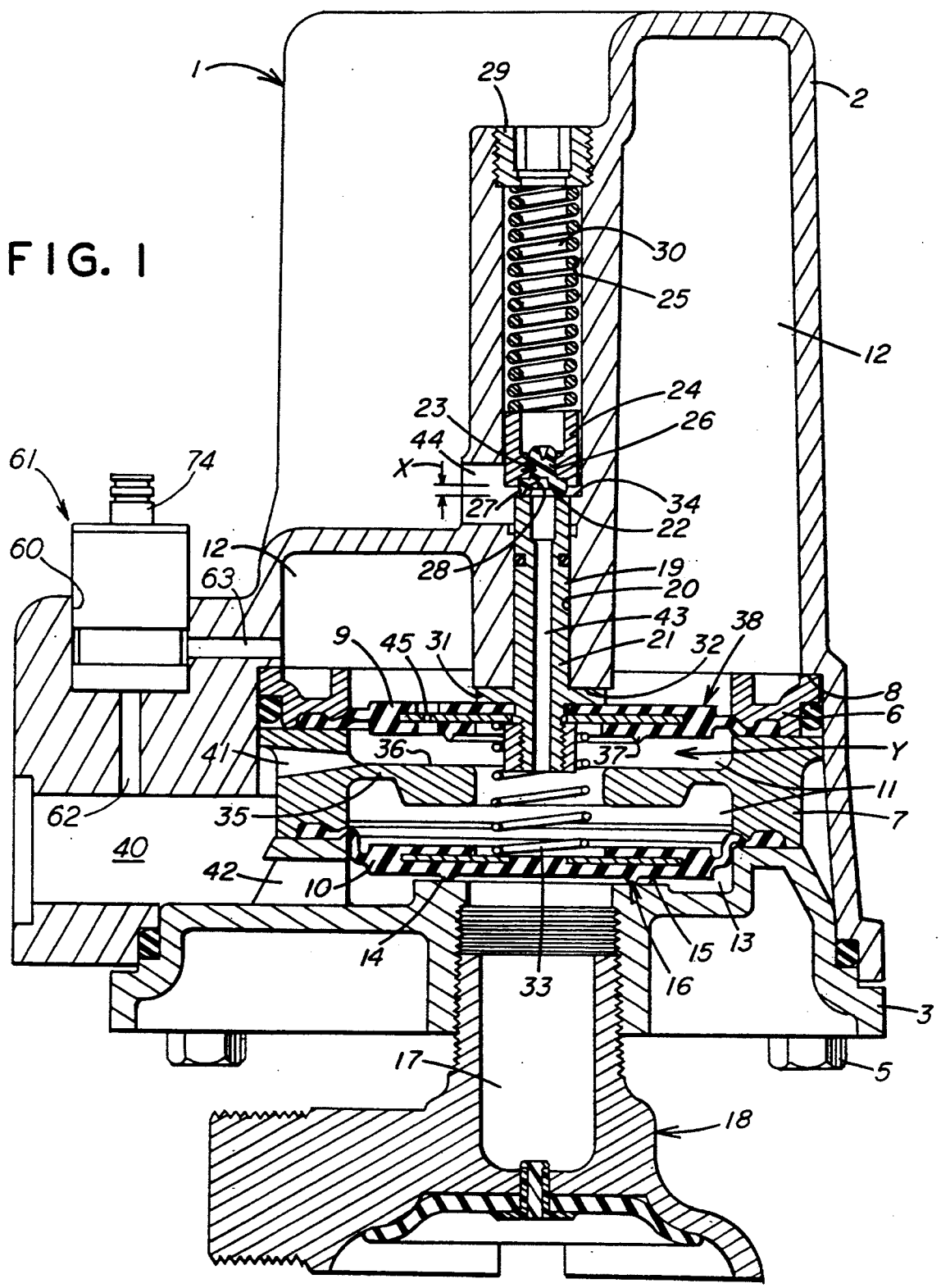
FIG. 1 is an elevation assembly view in section showing a vent valve device incorporating a manually actuable nullifier valve device in accordance with the present invention.

Vent valve device 1 comprises a body portion 2 and a cover portion 3 that closes an opening at one end of body portion 2 through which the majority of the valve components may be installed. Cover portion 3 is held in place by bolts 5 and, in turn, retains a pair of diaphragm clamping plates 6, 7 in place against a shoulder 8 of body portion 2. A control piston 9 in the form of an elastomeric diaphragm member is clamped at its outer periphery between clamping plates 6, 7 and a vent valve piston 10 in the form of a similar elastomeric diaphragm member is clamped at its outer periphery between clamping plate 7 and cover portion 3.

Formed between piston members 9 and 10 is a pilot chamber 11, the bounds of which are delineated by clamping plate 7. On the upper side of diaphragm member 10 opposite pilot chamber 11 is a control chamber 12 delineated by clamping plate 6 and body portion 2. On the under side of diaphragm member 10 opposite pilot chamber 11 is an actuating chamber 13 delineated by cover portion 3 and the outer periphery of an annular sealing bead 14 of diaphragm member 10 that, in conjunction with a seat 15 founded on cover portion 3, constitutes an exhaust valve 16. A vent port 17 is formed in cover portion 3 at a location within the bounds of annular sealing bead 14 and is fit with a vent protector 18.

Control piston 9 is fixed at its midpoint to a guide stem 19 that is disposed in a bore 20 formed in a projection 21 of body portion 2. One end 22 of stem 19 projects through bore 20 for operating a pilot valve 23 comprising a movable valve cartridge 24 that is disposed in a counterbore 25 of bore 20. Carried by valve cartridge 24 is a valve element 26 having an annular sealing bead 27 that is engageable with a valve seat 28 provided by the projecting end 22 of stem 19. Compressed in counterbore 25 between valve member 24 and a threaded plug 29 that closes counterbore 25 is a spring 30.

An outturned flange 31 of stem 19 is adapted to engage a stop 32 provided by projection 21 to establish the upwardmost position of diaphragm member 9. A spring 33 is positioned between diaphragm members 9 and 10 in order to bias diaphragm member 9 toward its upwardmost position, while biasing diaphragm member 10 in the opposite direction to a position in which sealing bead 14 of exhaust valve 16 is engaged with its seat 15.

The length of stem 19 is such that when flange 31 of stem 19 is engaged with stop 32, end 22 of stem 19 holds valve member 24 of pilot valve 23 a predetermined distance X away from a stop 34 formed at the base of counterbore 25. In this position, spring 30 is effective to provide a force sufficient to assure positive engagement of sealing bead 27 with seat 28, while concurrently stop 32 limits the potentially high fluid pressure forces acting on diaphragm member 9 to a value corresponding to the load of spring 30, to thereby prevent undue wear and/or damage to sealing bead 27.

An inturned flange 35 of clamping plate 7 provides a seat 36 with which an annular sealing bead 37 on the under side of diaphragm member 9 is engageable, seat 36 and sealing bead 37 constituting a cut-off valve 38. When diaphragm member 9 is in its upwardmost position, sealing bead 37 is displaced from seat 36 a distance Y that is greater than the distance X that valve member 24 is displaced from its stop 34.

Adapted to be connected to a branch pipe of the train brake pipe by a pipe flange (not shown) is a port 40 that is communicated with pilot chamber 11 via a passage 41 and with actuating chamber 13 via a passage 42.

Extending through guide stem 19 is a central passage 43 that communicates pilot chamber 11 with an exhaust passage 44 via pilot valve 23. A "breather" choke 45 is preferably provided in piston member 9, as shown, but may be alternatively located in clamping plate 6 in order to provide a restricted flow communication between control chamber 12 and brake pipe port 40. The restriction provided by choke 45 prevents the air in control chamber 12 from being reduced at the same rate as brake pipe pressure is reduced in pilot chamber 11. The size of this choke restriction is chosen so that the "breathing" of control chamber air via this choke will prevent a pressure differential across pilot piston 38 sufficient to open pilot valve 23, except in response to an emergency rate of reduction of brake pipe pressure.

Formed in body portion 2 is an opening 60 in which a nullifier valve 61 of the present invention is affixed, as by a press fit. A pair of passages 62, 63 are provided in body portion 2, passage 62 extending from brake pipe port 40 to the base of opening 60 and passage 63 extending from the sidewall of opening 60 to control chamber 12.

Figure 2:
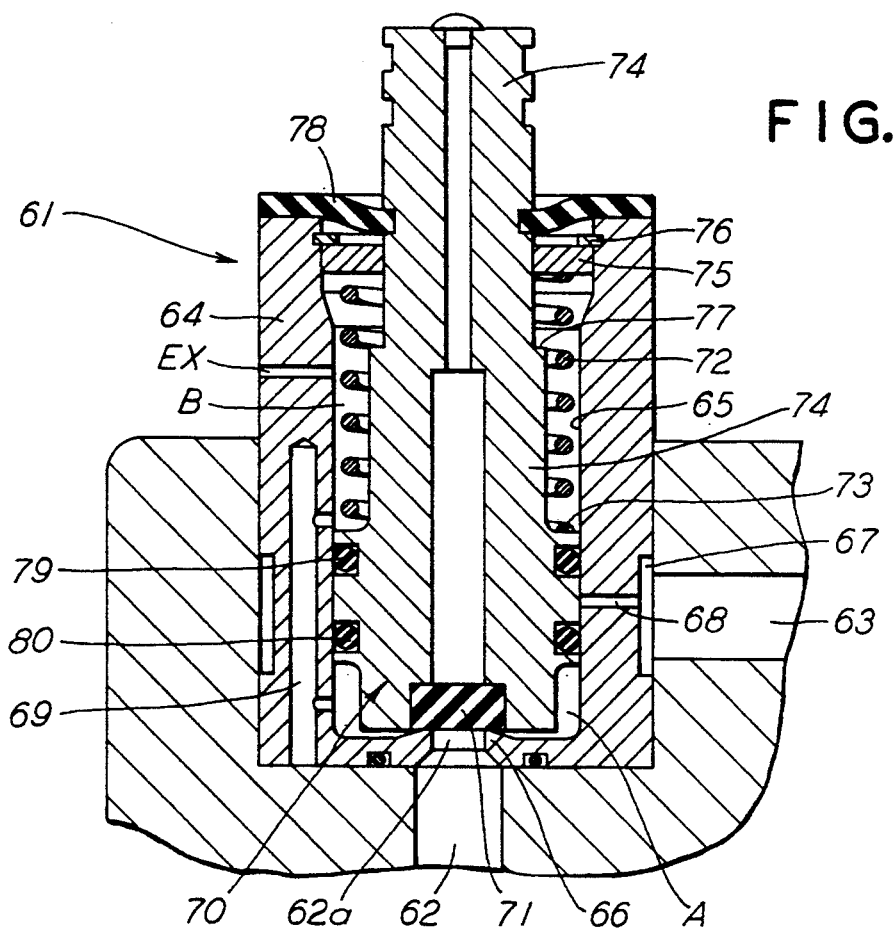
FIG. 2 is an enlarged partial sectional view showing the nullifier valve device in its normal closed position.

As shown in FIG. 2, nullifier valve 61 comprises a cylindrically shaped body 64 having a blind bore 65 that terminates at one end in an annular valve seat 66 surrounding a connecting passage 62a that extends between the bottom of bore 65 and passage 62. The outer periphery of body 64 is formed with an annular recess 67 that is aligned with passage 63, and communicated with bore 65 via a plurality of radial connecting passages 68. A bypass passage 69 in body 64 has its opposite ends terminating in ports at axially spaced-apart locations of bore 65. Another passage EX vents bore 65 at a location spaced axially from the upper port of bypass passage 69. This passage EX may be vented via body 64, as shown in FIG. 2, or via the central passage in stem 74, as shown in the alternate embodiment of FIG. 3.

Disposed for axial movement in bore 65 is a piston valve 70 having a valve element 71 contained in the piston head for engagement with valve seat 66 under the influence of a spring 72. One end of spring 72 bears against a shoulder 73 of piston stem 74 and its other end bears against a washer 75 that is held in place by a retaining ring 76. Stem 74 projects through washer 74 and is formed with a stop shoulder 77 that engages washer 75 to limit upward movement of piston valve 70 from a de-actuated position, as shown, to an actuated position. Washer 75 further serves to center and guide piston valve stem 74. Attached between the top surface of body 64, by screws or the like, and the projecting end of stem 74 is a dust boot 78 that closes the open end of bore 65 to isolate the piston valve from the elements. Affixed in a retaining groove formed in the projecting end of stem 74 is an elastomeric flap 78 that engages the top surface of body 64 in the de-actuated position of piston valve 70 to provide a dust seal that isolates the piston valve from the elements.

A pair of O-ring seals 79, 80 encircle the periphery of piston valve 70 so as to engage bore 65 at a location intermediate the spaced-apart ports of bypass passage 69 in the actuated position of piston valve 70, and on opposite sides of radial passages 69 in the de-actuated position of piston valve 70.

It will be understood that prior to charging, i.e., in the absence of any air pressure at port 40 of vent valve device 1, spring 33 establishes closure of vent valve 16 by reason of its biasing action on vent valve piston 10, while at the same time urging control piston 9 in an upward direction. The opposing force of spring 30, however, being greater than that of spring 33, forces pilot valve member 24 to move distance X into engagement with stop 34. This, in turn, forces flange 31 of stem 19 away from stop 32. Once valve member 24 engages stop 34, spring 30 becomes caged and, in effect, supports the upward-acting force of spring 33 on piston member 9. Consequently, piston member 9 is positioned so that flange 31 is spaced from stop 32 a distance X. Since distance Y is greater than distance X, as previously explained, sealing bead 37 of cut-off valve 38 will be disengaged from its seat 36 to assure that cutoff valve 38 remains open to accommodate subsequent charging of the vent valve device 1, as now explained.

During charging in normal service operation of the train, compressed air from the train brake pipe is registered at vent valve port 40, from where this air is directed via passage 42 to actuating chamber 13, via passage 41 to pilot chamber 11, and via choke 45 to control chamber 12. With cut-off valve 38 open, exhaust valve 16 and pilot valve 23 closed, as above explained, pressure develops in actuating chamber 13 and pilot chamber 11 in accordance with the pressure carried in the train brake pipe. The resultant differential force on vent valve piston 10 due to its differential effective area reinforces spring 33 to maintain exhaust valve 16 closed. With stabilizer valve 61 in its de-actuated position, the air in pilot chamber 11, in turn, charges control chamber 12 at a restricted rate via choke 45 to thereby establish an upward-acting pressure differential across control piston 9 which, in conjunction with the force of spring 33, moves control piston 9 upwardly through distance X until flange 31 engages stop 32. As this movement takes place, stem 19 forces valve member 24 off of its stop 34, further compressing spring 30. With the charging pressure forces on piston member 9 thus supported by stop 32, spring 30 is effective to establish a limited sealing force on sealing bead 28. It will be appreciated, therefore, that the potentially high forces capable of being developed on control piston 9 during charging are isolated from valve element 26 and particularly from sealing bead 27, thus protecting sealing bead 27 from premature wear and/or damage.

When charging is complete, the pressures effective in pilot chamber 11 and control chamber 12 equalize, it being understood that nullifier valve 61 is normally in its de-actuated position. Control piston 9 continues to be supported by stop 34, since the force of spring 30 is insufficient to overcome the combined force of spring 33 and the pressure force on control piston 9 due to its differential pressure area.

During a service brake application, brake pipe pressure is reduced at a service rate, in a well-known manner, such reduction being registered at port 40 and consequently in pilot chamber 11. The pressure in control chamber 12 is reduced with the brake pipe pressure reduction in pilot chamber 11, but at a slower rate due to the restriction of choke 45, thereby creating a downward-acting pressure differential across control piston 9. While this pressure differential will vary with the actual service rate of reduction of brake pipe pressure, a maximum pressure differential will develop in response to a full service brake application. The resultant maximum differential pressure force acting downward on control piston 9 combined with the force of spring 30 will only be sufficient to deflect control piston 9 in a downward direction a distance X, since at this point valve member 24 picks up stop 34, thereby caging spring 30. With spring 30 caged and thus ineffective to exert a force on control piston 9, the control piston is stabilized against further downward deflection. Accordingly, closure of pilot valve 23 is maintained by continued engagement of sealing bead 27 of valve element 26 with seat 28. The differential area of vent valve piston 10 subject to brake pipe pressure in chambers 11 and 13 is such as to maintain closure of vent valve 16 by reason of sealing bead 14 having engagement with seat 15, so long as closure of pilot valve 26 is maintained, as above explained.

During an emergency brake application, brake pipe pressure is reduced at an emergency rate that is greater than the aforementioned service rate, so as to produce a pressure differential across piston member 9 that is greater than the pressure differential resulting from a service rate of reduction of brake pipe pressure. The resultant downward-acting force on piston member 9 is sufficiently greater than the force created during a service brake application, as to overcome the loss of force resulting from the caging of spring 30 when control piston 9 has been deflected distance X.

Consequently, control piston 9 continues to be deflected in a downward direction beyond distance X, thereby pulling seat 28 formed at the end of guide stem 19 away from sealing bead 27 of valve element 26, to thereby open pilot valve 23. As the pilot valve opens, air vented directly from chamber 11 at an unrestricted rate to encourage continued downward deflection of control piston 9. As this downward deflection of control piston 9 continues through distance Y, control piston 9 assumes its emergency position in which sealing bead 37 engages seat 36 to close cut-off valve 38 and thereby isolate pilot chamber 11 from port 40 and the train brake pipe. By isolating pilot chamber 11 from the brake pipe, the air in the relatively small volume of pilot chamber 11 is vented quickly to accelerate the reduction of pressure in pilot chamber 11 acting on vent valve piston 10. This establishes a high pressure differential between pilot chamber air effective above vent valve piston 10 and actuating chamber air acting on the underside of vent valve piston 10, to overcome the bias force of spring 33 and deflect vent valve piston 10 in an upward direction.

Immediately upon such upward deflection of vent valve piston 10, exhaust valve 16 is opened by disengagement of sealing bead 14 from seat 15, thereby exposing the entire area of the underside of vent valve piston 10 to brake pipe pressure to positively establish and maintain exhaust valve 16 fully open. Accordingly, a local venting of brake pipe pressure is provided from port 40 to atmosphere via passage 42, actuating chamber 13, exhaust valve 16, vent port 17 and vent protector 18 to supplement the brake pipe pressure reduction initiated via the train brake pipe in order to hasten the emergency application through the train.

Following closure of cut-off valve 38, the pressure effective in control chamber 12 will continue to maintain control piston 9 in its downward-most position in which pilot valve 23 is held open, while the control chamber pressure blows down via choke 45.

Whenever the brake pipe pressure has been exhausted, spring 33 becomes effective to reset vent valve piston 10 and close exhaust valve 16. However, until the "blowdown" period has expired, the open pilot valve will maintain pilot chamber 11 vented, so that any attempt to recharge brake pipe pressure prematurely will result in the air under vent valve piston 10 causing exhaust valve 16 to open. Thus, any air supplied to the brake pipe is simply bypassed to atmosphere via vent protector 18. When the control chamber pressure has blown down to approximately 3 psi, control piston 9 is forced in an upward direction to open cut-off valve 38, but not sufficiently far to effect closure of pilot valve 23. During this final "blowdown" period, any air supplied to the brake pipe is vented via port 40, passage 41, the open cut-off valve, pilot chamber 11, central passage 43 in stem 19, the open pilot valve 23, and exhaust passage 44.

Following expiration of the "blowdown" period required to exhaust control chamber 12 via choke 45, spring 33 will be effective to move piston member 9 in an upward direction sufficiently to not only open cut-off valve 38, but to also close pilot valve 23 by engagement of seat 28 with sealing bead 27 of valve element 26. Vent valve device 1 is thus reset to accommodate charging of the brake pipe, as previously explained, with flange 31 being spaced from stop 32 a distance X.

Having explained the basic operation of vent valve device 1, the manner in which this vent valve device 1 may be selectively disabled, in accordance with the present invention, will now be explained. As hereinbefore mentioned, disabling vent valve device 1 when performing the single car test procedure is essential to prevent the vent valve from being actuated during the service stability test, due to the more stringent standards imposed by the newly mandated A.A.R. test code. In particular, a higher rate of reduction of brake pipe pressure is required by this new test code, at which rate the car control valve must remain stable as an indication of its ability to distinguish between service and emergency rates in actual service, particularly when employed in the longer modern railway cars being placed in service today.

In performing the single car test, the test apparatus is connected by an outlet hose and hose coupling to the railway car brake pipe hose in the usual, well-known manner. The regulating valve of the single car test apparatus is then placed in handle position #1 to fully charge the car brake pipe to the desired test operating pressure. As the car brake pipe becomes charged, air is directed from the vent valve brake pipe port 40 to actuating chamber 13 via passage 42, to pilot chamber 11 via passage 41, and to control chamber 12 via choke 45, as previously explained relative to charging the train brake pipe during normal service operation. Nullifier valve 61 is assumed to be in its normal de-actuated position, as shown in FIG. 2. With cut-off valve 38 open, exhaust valve 16 and pilot valve 23 closed, as previously explained, pressure develops in actuating chamber 13 and pilot chamber 11, in accordance with the pressure to which the car brake pipe is charged by the single car test apparatus. The resultant differential force on vent valve piston 10 due to its differential effective pressure area reinforces spring 33 to maintain exhaust valve 16 closed. The air in pilot chamber 11, in turn, charges control chamber 12 at a restricted rate via choke 45 to thereby establish an upward-acting pressure differential across control piston 9 which, in conjunction with the force of spring 33, moves control piston 9 upwardly through distance X until flange 31 engages stop 32. As this movement takes place, the end 22 of stem 19 engages valve member 24 to isolate the pilot chamber pressure from atmosphere.

Following completion of this charging and prior to initiating the service stability test, nullifier valve 61 is kept inactive by being maintained in its de-actuated position, due to spring 72 exerting a force on piston valve 70 sufficient to overcome the force of brake pipe pressure in passage 62, 62a acting on the relatively small area of valve element 71 within the circumference of valve seat 66. It will be appreciated that during this inactive period of nullifier valve 61, a chamber A at the face of piston valve 70 is vented to atmosphere via bypass passage 69, spring chamber B on the spring side of piston valve 70 and vent passage EX, thereby preventing any buildup of pressure over the full area of piston valve 70, in the event check valve 66/71 or O-ring seal 80 should leak. In this manner, inadvertent actuation of piston valve 70 due to a buildup of pressure in chamber A in consequence of such leakage is prevented.

When it is desired to initiate the service stability test portion of the single car test procedure, nullifier valve 61 should be activated to disable the vent valve device 1. This is accomplished by manually pulling on the projecting end of stem 74. In this manner, valve element 71 is lifted from valve seat 66 to open the valve and supply the brake pipe pressure effective in passage 62, 62a to control chamber A. Since the full area of piston valve 70 is subject to the pressure in chamber A, sufficient force is developed to overcome the opposing force of spring 72 and accordingly maintain piston valve 70 in its actuated position, as delimited by engagement of stop shoulder 77 with washer 75. Thus, only a momentary pull on stem 74 is required to activate nullifier valve 61.

In consequence of the transition of piston valve 65 from its de-actuated position to its actuated position, two pneumatic connections are made. First, O-ring seal 79 is shifted to a location between the upper port of bypass passage 69 and vent passage EX, thereby isolating chamber A from atmosphere so that the brake pipe pressure in chamber A is assured of building up sufficiently to maintain piston valve 65 in its actuated position without continued manual operation. Secondly, O-ring seal 80 is shifted to the upper side of the plurality of radial connecting passages 68, thereby establishing fluid pressure communication between control chamber 12 of vent valve device 1 and chamber A of valve 61. In that the respective pressures in these chambers are substantially equal in a fully charged condition, as explained, substantially no flow of air takes place until the service stability test is initiated, nullifier valve 61, however, being maintained in an activated condition preparatory to disabling vent valve device 1 at the time such stability test is actually undertaken.

The service stability test is initiated by movement of the single car test apparatus regulating valve handle to a position in which a reduction of brake pipe pressure occurs at the brake pipe reduction rate specified in the new A.A.R. mandated single car test procedure. As the brake pipe pressure reduction takes place, pressure in control chamber 12 is able to follow the reduction of brake pipe pressure effective in brake pipe passage 40, by virtue of the substantially unrestricted flow path provided therebetween by the open check valve 66/71 of nullifier valve 61. This substantially unrestricted flow of pressure from chamber 12 via nullifier valve 61 occurs in parallel with the existing restricted flow via "breather" choke 45. Accordingly, pressure equalization is maintained between chamber 12 and chamber 11 on opposite sides of pilot piston 9, thus assuring that only a minimal pressure differential can be developed across the pilot piston. In thus desensitizing pilot piston 9, vent valve device 1 is disabled to prevent its inadvertent and undesirable operation during this service stability test.

Following completion of the service stability test, and prior to conducting further tests in accordance with the single car test procedure, nullifier valve 61 should be reset by manually pushing stem 74 back to its normal position, as shown. In so doing, O-ring seal 80 initially closes the connection between control chamber 12 and chamber A via passage 63, it being understood that any residual pressure in chamber A or pressure created by piston displacement is readily dissipated via open check valve 66/71, since O-ring seal 79 does not uncover vent passage EX until after closure of passage 63. Following opening of vent passage EX by O-ring seal 79, chamber A is vented via bypass passage 69, and valve element 71 then engages valve seat 66, such that only the relatively small area of valve element 71 within the circumference of seat 66 is subject to brake pipe pressure. The force exerted by spring 72 is greater than the force of pressure acting on the small area of piston valve 70 following brake pipe recharge, to maintain nullifier valve 61 in this de-actuated position in which vent valve device 1 is conditioned for normal service, as hereinbefore explained.

Figure 3:
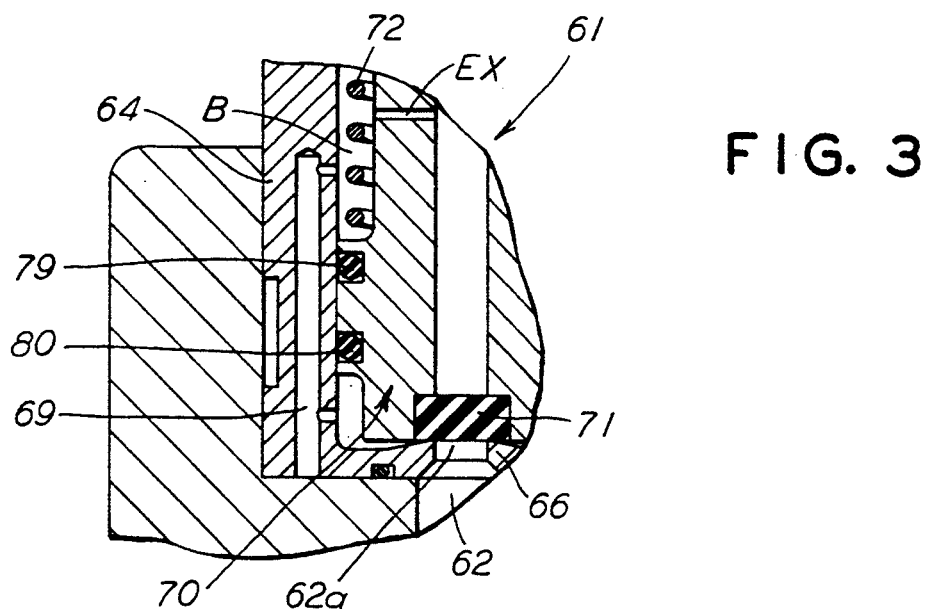
FIG. 3 is a view similar to FIG. 2 showing an alternate embodiment of the nullifier valve of the present invention.

In the embodiment of the invention shown in FIG. 3, bypass passage 69 extends axially along bore 65 a greater distance than in the embodiment of FIG. 2, so that o-ring seal 79 remains within the passage openings to bore 65 when piston valve 70 is actuated. Accordingly, chamber A is continually connected to atmosphere via the bypass passage 69 and vent passage EX, the purpose being to provide an audible sound of escaping air from brake pipe passage 40 when the nullifier valve is actuated. This will serve as a reminder to the tester to reset the nullifier valve following completion of the service stability test. The drill size of bypass passage 69 is such that normal leakage past seated valve 66/71 will be dissipated without excessive loss of brake pipe pressure.

In the event a tester performing the single car test fails, for whatever reason, to manually reset nullifier valve 61 in accordance with the prescribed practice, the nullifier valve will automatically reset any time brake pipe pressure is reduced below a predetermined value of approximately 55 psi. Normally this would occur in the course of conducting subsequent tests, but even in failing to perform such subsequent tests, would never the less occur when the brake pipe pressure is dumped at the time of removing the single car test device from its coupling with the car brake pipe. In either case, spring 72 is effective when the brake pipe pressure falls below this predetermined value of approximately 55 psi to force piston valve 70 to its normal de-actuated position, as shown. In this manner, the nullifier valve is assured of being closed when the car is put back into service following completion of the single car test.

It should be noted that spring 72 in resetting nullifier valve 61 when brake pipe pressure drops below approximately 55 psi, also prevents accidental actuation of the nullifier valve, in that a positive manual force of approximately six pounds is required to actuate piston valve 70.

In accordance with the foregoing, it will be appreciated that the vent nullifier valve 61 effectively prevents the vent valve device 1 from being inadvertently actuated during the control valve service stability test; does not influence the brake pipe reduction rate required for carrying out the stability test; is automatically resettable; and is not susceptible to accidental operation during normal service.

I claim:

1. A vent valve device for locally venting a railway car brake pipe when an emergency rate of reduction of the fluid pressure carried in said brake pipe is initiated, comprising:
   (a) a housing having an inlet port to which said brake pipe is connected, a vent port, a first chamber communicated with said inlet port, and a second chamber;
   (b) flow restrictor means via which fluid pressure communications is provided between said first and second chambers for establishing a predetermined pressure differential therebetween when said brake pipe pressure is reduced at an emergency rate;
   (c) vent valve means for establishing fluid pressure communication between said inlet port and said vent port in accordance with said predetermined pressure differential being established between said first and second chambers; and
   (d) nullifier valve means in parallel with said flow restrictor means between said second chamber and said brake pipe, said nullifier valve means being manually operable for establishing fluid pressure communication between said second chamber and said brake pipe in bypass of said flow restrictor means, thereby preventing said pressure differential from being established when said brake pipe pressure is reduced at said emergency rate.

2. A vent valve device as recited in claim 1, wherein said nullifier valve means is automatically reset to interrupt said fluid pressure communication between said second chamber and said brake pipe when the fluid pressure effective in said second chamber is less than a predetermined value.

3. A vent valve device is recited in claim 2, wherein said nullifier valve means comprises:
   (a) a body fixed to said housing;
   (b) a bore in said body having an open end and a closed end;
   (c) a first passage at least partly in said body connecting said bore with said brake pipe;
   (d) a second passage at least partly in said body connecting said bore with said second chamber;
   (e) a piston valve in said bore having an actuating stem projecting from said open end of said bore externally of said body, said piston valve cooperating with said bore at said closed end thereof to form an actuating chamber, said piston valve having an actuated position in which fluid pressure communication is established between said first and second passages and said actuating chamber, and a de-actuated position in which said first and second passages are cut off from said actuating chamber by said piston valve; and
   (f) spring means for biasing said piston valve toward said de-actuated position.

4. A vent valve device for locally venting a railway car brake pipe when an emergency rate of reduction of the fluid pressure carried in said brake pipe is initiated, comprising;
   (a) a housing having an inlet port to which said brake pipe is connected, a vent port, a first chamber communicated with said inlet port, and a second chamber;
   (b) flow restrictor means via which fluid pressure communication is provided between the first and second chambers for establishing a predetermined pressure differential therebetween when said brake pipe pressure is reduced at an emergency rate;
   (c) vent valve means for establishing fluid pressure communication between said inlet port and said vent port in accordance with said predetermined pressure differential being established between said first and second chambers;
   (d) nullifier valve means in parallel with said flow restrictor means between said second chamber and said brake pipe for establishing fluid pressure communication between said second chamber and said brake pipe in bypass of said flow restrictor means in response to said nullifier valve means being predetermined pressure differential from being established in response to an emergency rate of reduction of said brake pipe fluid pressure and for automatically resetting to interrupt said fluid pressure communication between said second chamber and said brake pipe when the fluid pressure effective in said second chamber is less than a predetermined value; and
   (e) said nullifier valve means comprising:
      (i) a body fixed to said housing;
      (ii) a bore in said body having an open end and a closed end;
      (iii) a first passage at least partly in said body connecting said bore with said brake pipe;
      (iv) a second passage at least partly in said body connecting said bore with said second chamber;
      (v) a piston valve in said bore having an actuating stem projecting from said open end of said bore externally of said body, said piston valve cooperating with said bore at said closed end thereof to form an actuating chamber, said piston valve having an actuated position in which fluid pressure communication is established between said first and second passages and said actuating chamber, and a de-actuated position in which said first and second passages are cut off from said actuating chamber by said piston valve; and (vi) spring means for biasing said piston valve toward said de-actuated position.

5. A vent valve device as recited in claim 4, wherein said spring means biases said piston valve such as to force said piston valve to said de-actuated position when the fluid under pressure effective in said actuating chamber is less than said predetermined value to thereby provide said automatic reset of said nullifier valve.

6. A vent valve device as recited in claim 4, wherein said piston valve comprises:
(a) first valve means including;
   (i) said bore being formed at said closed end with an annular valve seat encircling said first passage; and
   (ii) said piston valve being a spool member having said stem on one end thereof and a face on the other end thereof on which is carried a valve element engageable with said valve seat in said de-actuated position in which said valve seat delineates within the periphery thereof a reduced pressure area of said face, said valve element being disengageable from said valve seat in said actuated position; and
(b) second valve means including said spool member having a first seal ring surrounding the periphery thereof and engaging said bore at a location between said actuating chamber and one side of said second passage in said de-actuated position of said piston valve, and between said actuating chamber and the other side of said second passage in said actuated position of said piston valve.

7. A vent valve device as recited in claim 6, wherein said nullifier valve means further comprises passage means between said actuating chamber and atmosphere for venting said actuating chamber.

8. A vent valve device as recited in claim 7, wherein said nullifier valve means further comprises a vent chamber formed between said one end of said spool member and said open end of said bore, said passage means interconnecting said actuating chamber and said vent chamber in said actuated position.

9. A vent valve device as recited in claim 8, wherein said passage means comprises a bypass passage in said body, the opposite ends of said bypass passage opening in said bore within said actuating chamber and said vent chamber respectively.

10. A vent valve device as recited in claim 9, wherein said second valve means further comprises said spool member having a second seal ring surrounding the periphery thereof in axial spaced-apart relationship with said first seal ring and engaging said bore on said other side of said second passage in said de-actuated and actuated positions.

11. A vent valve device as recited in claim 10, wherein said piston valve further comprises third valve means for cutting off said bypass passage from said vent chamber in said de-actuated position of said piston valve.

12. A vent valve device as recited in claim 11, wherein said third valve means further comprises said second seal ring engaging said bore at a location intermediate said opposite ends of said bypass passage in said de-actuated position of said piston valve and at a location between the upper-most one of said ends of said bypass passage and said open end of said bore in said actuated position of said piston valve.

13. A vent valve device as recited in claim 8, wherein said nullifier valve means further comprises a washer retained on said body within said vent chamber, said spring bearing against said one end of said spool member and said washer.

14. A vent valve device as recited in claim 13, wherein said nullifier valve means further comprises guide means for guidably supporting axial movement of said piston valve in said bore.

15. A vent valve device as recited in claim 14, wherein said guide means comprises:
(a) said washer having an opening therethrough; and
(b) said stem projecting through said opening.

16. A vent valve device as recited in claim 4, wherein said nullifier valve means further comprises a dust cover connected to said stem, said dust cover engaging said body in surrounding relationship with said open end of said bore in said de-actuated position of said piston valve.

* * * * *